United States Patent [19]
George, Jr.

[11] Patent Number: 5,193,877
[45] Date of Patent: * Mar. 16, 1993

[54] PREFORM MASK FOR PAINTING VEHICLES

[76] Inventor: David L. George, Jr., 1372 Phoenixville Pike, West Chester, Pa. 19380

[*] Notice: The portion of the term of this patent subsequent to May 7, 2008 has been disclaimed.

[21] Appl. No.: 845,498

[22] Filed: Feb. 28, 1992

Related U.S. Application Data

[63] Continuation of Ser. No. 565,357, Aug. 9, 1990, abandoned, which is a continuation of Ser. No. 368,422, Jun. 19, 1989, Pat. No. 5,012,760, which is a continuation of Ser. No. 55,166, May 28, 1987, abandoned.

[51] Int. Cl.$^5$ ............................................. B66C 11/00
[52] U.S. Cl. .................................... 296/136; 118/505; 150/166
[58] Field of Search ............... 296/136, 95.1; 150/166, 150/168; 160/370.2, DIG. 2; 118/505, 301; 427/256

[56] References Cited

U.S. PATENT DOCUMENTS

| | | |
|---|---|---|
| 2,787,31 | 4/1957 | Cohen et al. .................. 296/136 X |
| 1,472,651 | 10/1923 | Holling ............................ 296/136 X |
| 1,605,670 | 10/1925 | Lee . |
| 1,679,886 | 8/1928 | Wright ............................ 296/136 X |
| 1,719,055 | 7/1929 | Herzer ............................ 296/136 X |
| 1,918,423 | 7/1933 | Persinger ....................... 296/136 X |
| 2,082,791 | 6/1937 | Copeman . |
| 2,210,233 | 8/1940 | DeLillo . |
| 2,227,453 | 11/1941 | Koch . |
| 2,286,473 | 6/1942 | Duggan . |
| 2,552,287 | 5/1948 | Layne . |
| 2,652,023 | 8/1951 | Kletsky . |
| 2,728,323 | 12/1955 | Walton et al. . |
| 2,733,747 | 2/1956 | Altschul ......................... 296/136 X |
| 2,994,356 | 8/1961 | Fleming ......................... 296/136 X |
| 3,032,433 | 5/9162 | Lewis et al. . |
| 3,130,078 | 4/1964 | Lewis et al. ................... 296/136 X |
| 3,376,012 | 4/1967 | Thier .............................. 296/136 |
| 4,209,197 | 6/1980 | Fischer .......................... 296/136 X |
| 4,294,483 | 10/1981 | Ferris ............................. 296/136 |
| 4,398,495 | 8/1983 | Harris et al. . |
| 4,612,967 | 9/1986 | Kamen et al. ................. 296/136 X |
| 4,646,364 | 3/1987 | O'Larey . |
| 4,789,579 | 12/1988 | Tutas et al. .................... 118/505 X |
| 4,795,207 | 1/1989 | Clarke ............................ 296/136 |
| 4,810,015 | 3/1989 | McNeil .......................... 296/136 X |
| 4,821,785 | 4/1989 | Rolan ............................. 296/136 X |
| 4,958,881 | 9/1990 | Piros .............................. 296/136 X |
| 5,012,760 | 5/1991 | George, Jr. .................... 118/505 |

FOREIGN PATENT DOCUMENTS 2345222 10/1977 France ............................ 296/136
7415295 5/1976 Netherlands .

Primary Examiner—Charles A. Marmor
Assistant Examiner—Joseph D. Pape
Attorney, Agent, or Firm—Ratner & Prestia

[57] ABSTRACT

A disposable vehicle cover constructed of a porous flexible sheet material, optionally consisting of porous and non-porous layers, adapted to conform generally to the shape of a vehicle body and optionally includes at least one removable, tear-out section, adapted to expose a predetermined portion of a vehicle, and optionally also includes at least one impact absorbing, foam strip which is positioned longitudinally along a side of a vehicle when the cover is in use.

8 Claims, 2 Drawing Sheets

PREFORM MASK FOR PAINTING VEHICLES

THis applicatino is a continuation of appl. Ser. No. 07/565,357 filed Aug. 9, 1990, now abandoned, which is a continuation of application Ser. No. 07/368,422, filed Jun. 19, 1989, now U.S. Pat. No. 5,012,760 which is a continuation of appl. Ser. No. 07/055,166 filed May 28, 1987, now abandoned.

FIELD OF THE INVENTION

This invention relates to a disposable cover for protecting vehicle surfaces in situations where paint, solvents, dirt and other environmental hazards deleterious to a vehicle surface are present. More specifically, this invention pertains to such a cover which is relatively inexpensive and is easily adaptable to fit vehicles of different sizes and shapes. Preferred forms of the invention include means to protect the vehicle from minor impacts and/or to facilitate exposure of selected parts of the vehicle.

BACKGROUND OF THE INVENTION

U.S. Pat. No. 3,130,078 to Lewis et al., discloses a vehicle cover comprising fabric panels, joined to each other by more or less continuous rows of simple stitching to conform roughly to at least a portion of an automotive vehicle. The vehicle cover is designed so that flaps and other portions of the cover may be raised to expose doors, fenders, trunks, hoods etc. that are to be selectively painted.

U.S. Pat. No. 2,210,233 to DeLillo teaches a protective device adapted to cover and shield a surface to be protected, typically a vehicle surface. The device for protecting a surface from sprayed paint or the like, comprises a strip of flexible sheet material, such as creped paper. The side edge of this paper is gathered so that the strip naturally assumes a somewhat accurate form. A narrow adhesive band extends continuously along the gathered edge and adhesive areas are also provided on the opposite edge of the strip.

U.S. Pat. No. 2,652,023 to Kletsky relates to wheel masks for automotive vehicles adapted to be mounted on a tire when a vehicle is being painted. The protective cover comprises a disk like sheet of material, with an elasticized edge, adapted to cover and conform to the circular formation of a tire and wheel.

U.S. Pat. No. 2,552,287 to Layne also teaches a masking device for protecting an automobile wheel and tire during body painting. As contrasted with Keltsky's elasticized edge, Layne uses a resilient wire connecting the ends of a circumferential loop.

Vehicle covers may also be constructed of other materials such as cloth, or plastic, or paper strips. These covers are problematic. Cloth and plastic covers are difficult to use because they do not easily conform to a variety of different vehicle shapes and sizes. Cloth and plastic covers also require storage and periodic cleaning. Still further, plastic covers are even less desirable because they entrap moisture from the air and plasticizers from curing plastic vehicle components, which may damage the vehicle interior. Paper strips are also undesirable because they require fitting and cutting by hand and permit solvent migration through the paper cover onto the vehicle surface. Furthermore, these vehicle covers provide no adequate protection against certain types of impact damage and are ill-suited for use in a body shop or during vehicle transportation, where such protection is desirable. Additionally, these covers do not provide a reliable means for identifying the covered vehicle without removing the vehicle cover.

BRIEF DESCRIPTION OF THE INVENTION

The present invention comprises a flexible porous sheet material shaped to conform and generally to cover a vehicle body. Preferably the cover is inexpensive and disposable. Preferably also it is assembled from a planar preform.

Most preferably, the planar preform is supplied as a separable portion of a continuous roll. Alternatively, the continuous roll preform supply may comprise a continuous length of separable preform precursors, in each of which, the removable scrap surrounding the periphery of the preform is cut for easy removal prior to use but is left in the roll supply at the time of manufacture. In specific configurations, the cover includes at least one of the following additional features:

(a) at least one removable tear out section to facilitate uncovering a preselected portion of a vehicle surface for painting, etc.

(b) energy-absorbing strips, to protect the sides of the protected vehicle from minor impacts, and (c) material of construction including a non-porous layer adjacent the porous layer.

The cover also preferably includes a means of identifying the covered vehicle without removing or otherwise disturbing the vehicle cover.

DETAILED DESCRIPTION OF THE INVENTION

Figure 1:
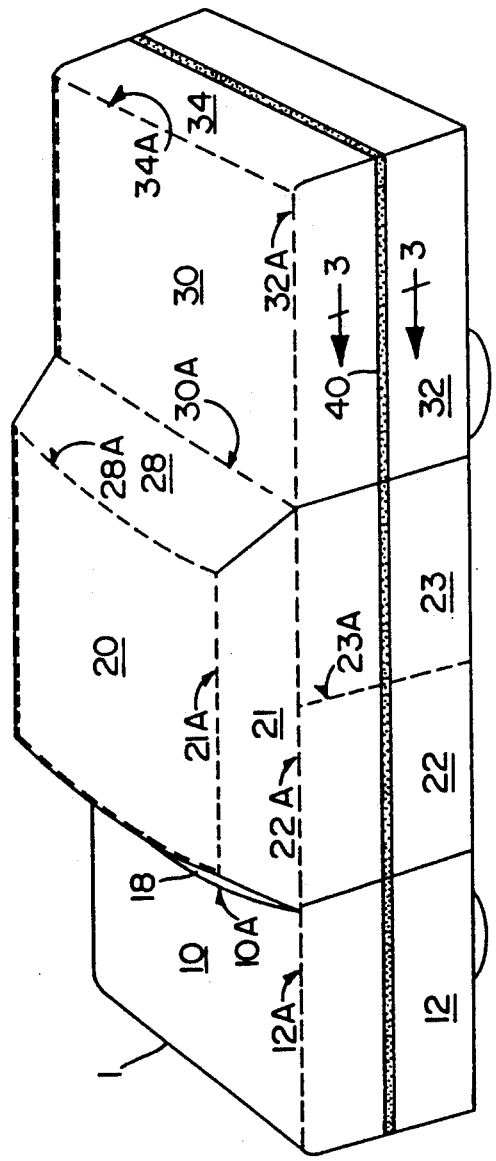
FIG. 1 is a perspective view of the preferred embodiment of the vehicle cover of the present invention, in place on a vehicle.

Referring specifically to FIG. 1, there is shown a vehicle cover 1, comprised of a porous, flexible, sheet material such as paper adapted to conform to the shape of a vehicle embodying one form of the present invention, in place on a vehicle. Cover 1 includes removable panels 10, 12, 18, 20, 21, 22, 23, 28, 30, 32, 34, each detachably attached at edges thereof, to at least one abutting panel along common perforated foldable crease or edge lines 10A, 12A, 18A, etc.

Figure 2:
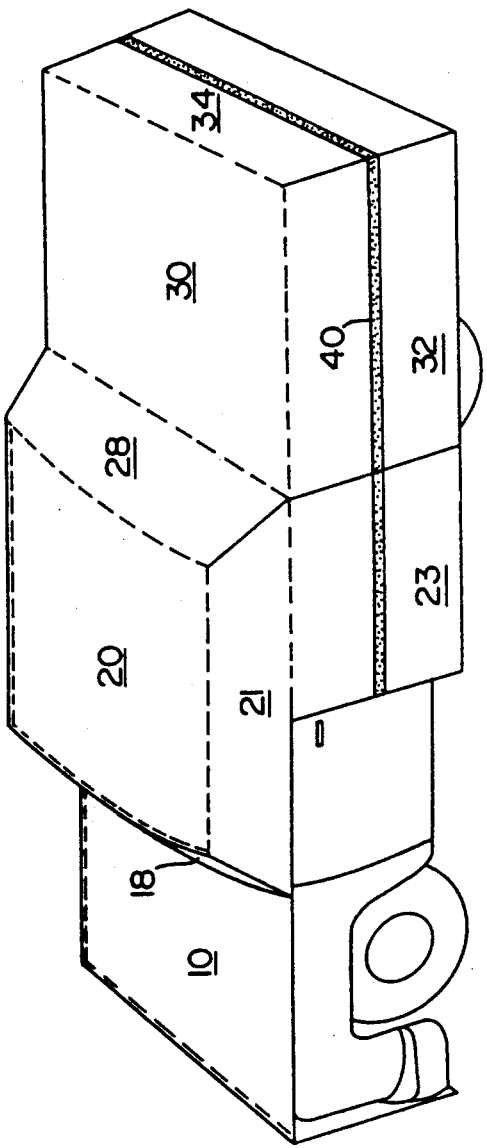
FIG. 2 is a perspective view of the vehicle cover shown in FIG. 1, with selected tear-away segments removed, thus exposing a portion of the vehicle.

In FIG. 2, vehicle cover 1 is shown with panels 12 and 22 removed. This is facilitated by tearing cover 1 along perforated lines 12A and 22A and 23A, thus exposing portions of the protected vehicle for painting, etc., while leaving the remainder of cover intact. When used for protecting vehicles in transit, for example, fold lines 10A, 12A, 18A, etc., need not be perforated. In such uses, there is no need to remove individual panels for painting, etc.

Figure 3:
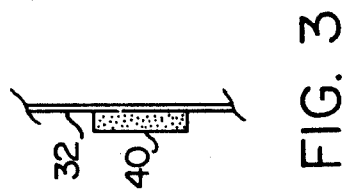
FIG. 3 is a detailed, cross-sectional view of a part of the cover as shown in FIG. 1, in plane 3—3.

Though not essential in all embodiments, the present invention preferably includes an impact absorbing protector such as a foam strip 40 (see cross section in FIG. 3) running along the length and preferably around the entire perimeter of the vehicle.

Figure 4:
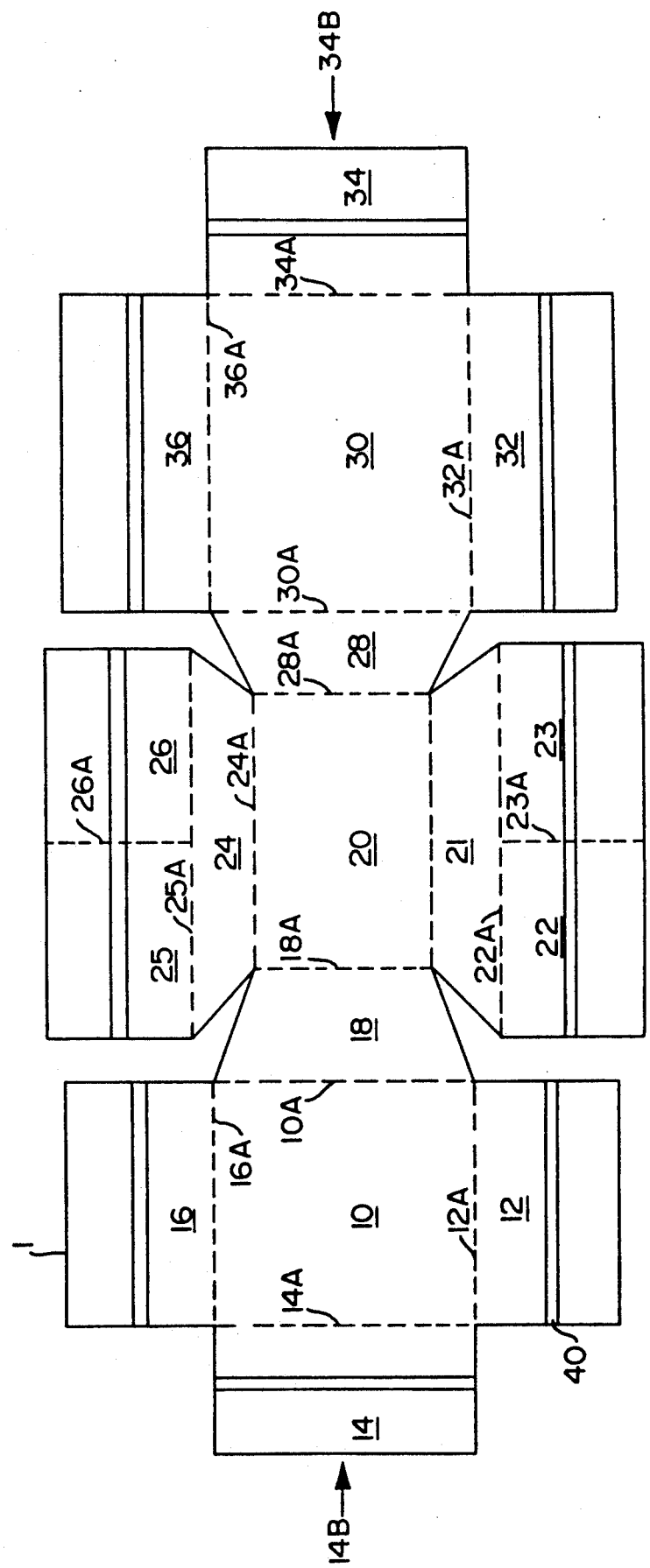
FIG. 4 shows a cut pattern, i.e., a preform, suitable for forming a cover, as shown in FIG. 1.

In FIG. 4 is shown a generally planar preform from which may be formed a vehicle cover 1, including a number of additional segments, 16, 24, 25, 26 and 36, not shown in FIG. 1. The preform comprises a linear array of segments, connected by common fold lines which may be perforated to facilitate removal, and which when folded along such lines, is adapted to cover the rear, back and generally upward facing surfaces of a vehicle. The array includes a central, reduced-width segment 20, adapted to cover the roof of a vehicle and extending therefrom, trapezoidal segments 18, 21, 24 and 28, adapted to cover the window surfaces of a vehicle. The minor bases of trapezoidal segments 18 and 28 abut the roof covering segment along common fold lines 18A and 28A. The major bases of segments 18 and 28 abut rectangular hood covering segment 10 and deck covering segment 30, along common fold lines 10a and 30A, respectively. Abutting opposite edges of the hood and deck covering segments and attached at common fold lines 14A and 34A, are terminal segments 14 and 34, adapted to cover the front and back of a vehicle, respectively. Attached at common edge lines 12A and 16A and extending outwardly from opposite edges of hood covering segment 10 are front fender covering segments 12 and 16. Rearwardly, attached at common edge lines 32A and 36A and extending outwardly from opposite edges of deck covering segment 30 are front fender covering segments 32 and 36.

Referring again to roof covering segment 20, attached thereto at common fold lines 21A and 24A and extending therefrom are trapezoidal segments 21 and 24, the minor bases of which abut the roof covering segment. The major bases of segment 21 abuts at common edge line 22A, a generally rectangular side covering segment, comprising a forward segment 22 and a rearward segment 23. Between segments 22 and 23 is common edge line 23A. The major base of segment 24 abuts at common edge line 25A, a generally rectangular side covering segment, comprising a forward segment 25 and a rearward segment 26. Between segments 25 and 26 is common edge line 26A.

The preform, as shown in FIG. 4, is intended to be placed on a vehicle so that individual preform segments correspond to the vehicle surface, in a manner that the preform generally conforms to the shape of a vehicle. The preform is secured and held in place by joining abutting segments, which are not otherwise connected, along common fold lines, with a securing means such as adhesive tape. Typically joined at their abutting edges are segments 12 and 22, 23 and 32, 26 and 36 and 25 and 16. Also joined at their common edges are segments 21 and 24 to segments 18 and 28. Additionally, segment 14 is joined to segments 12 and 16 and segments 34 is joined to segments 32 and 36 at their abutting edges.

Preferably, a preform such as that shown in FIG. 4 is conveniently supplied as a separable part of a continuous roll with one edge, for example 14b, separably connected, such as by a perforated line to an identical preform at edge 34b of the identical preform which precedes it on the continous roll.

With respect to materials of construction, the vehicle cover of the present invention, in its simplest embodiment, is comprised of a single layer of paper for absorbancy (for capture of paint and solvent in an auto body shop) and porosity (to prevent entrapment of moisture or gasified plasticizers during transportation). For some embodiments, however the vehicle cover is constructed of a composite, flexible, sheet-material consisting of porous and non-porous layers, typically a plastic backed paper material.

The porous layer is preferably paper, but can be any similar, suitable material, which is readily available, absorbent and inexpensive. This layer is preferably of such thickness that it has sufficient absorption capacity yet is not so thick so as to make handling difficult.

The non-porous material is preferably a lightweight pliable plastic material such as a polyvinylchloride. Furthermore, the non-porous material may have varying degrees of non-porosity. In certain circumstances, for example, it may be desirable for the non-porous material to be selectively non-porous to organic solvents, yet porous to water and water vapor.

In general, the function of the non-porous layers is to prevent migration of paint or solvent through the cover to the underlying vehicle surface. The composite, flexible sheet-material can be assembled by any number of methods, such as by fusing a paper-like material to a plastic-like material, or by applying a solution of cellulose to a plastic backing, or by applying a plastic solution to a paper or other cellulose constructed sheet material.

Furthermore, it is contemplated that the vehicle cover of the present invention may be used with either the porous or non-porous surface exposed and may further include more than one porous or non-porous layers.

Additionally, in accordance with the preferred form of the present invention, the vehicle cover may be pre-numbered or color coded so as to provide a means of identifying a covered vehicle without removing the vehicle cover.

In all forms of the invention, the material used is preferably lightweight and inexpensive so that the cover is essentially disposable after one or a small number of uses. While this invention has been described with reference to specific, and particularly, preferred embodiments thereof, it is not limited thereto and the appended claims are intended to be construed to encompass not only the specific forms and variants of the invention shown but to such other forms and variants as may be devised by those skilled in the art without departing from the true spirit and scope of this invention.

What is claimed:

1. A disposable, flexible preform having sufficient flexibility to be planar when disposed on a completely flat surface and to cover and conform generally to the shape of a vehicle over which it is placed, said preform comprising a plurality of planar polygonal segments having shapes and sizes which cover surface segments of a vehicle and connected together alogn perforated fold lines to permit tearing to expose selected surface segments of a vehicle.

2. A supply of disposable, flexible preforms having sufficient flexiblity to be planar when disposed on a completely flat surface and to cover and conform generally to the shape of a vehicle over which it is placed, each such preform connected to another such preform along a weakened line and comprising a plurality of planar polygonal segments having shapes and sizes which cover surface segments of a vehicle and connected together along perforated fold lines to permit tearint to expose selected surface segments of a vehicle.

3. A method of covering a vehicle comprising the steps of:
   providing a disposable flexible planar preform having sufficient flexibility to be planar when disposed on a completely flat surface and to cover and conform to the shape of a vehicle when assembled and comprising a plurality of planar polygonal segments having shapes and sizes which cover surface segments of a vehicle and connected together along perforated fold lines to permit tearing to expose selected surface segments of a vehicle;

and placing said disposable flexible planar preform over a vehicle to cover the vehicle.

4. A method as claimed in claim 3 further comprising the step of tearing at least one of said plurality of planar polygonal segments along said perforated fold lines to expose at least oen of said selected surface segments of a vehicle.

5. A disposable, flexible preform adapted to cover and conform generally to the shape of a vehicle over which it is placed, said preform comprising:

an undersurface directly contacting the vehicle, said preform having sufficient flexibility that the entire undersurface directly contacts a planar surface when said preform is disposed on the planar surface; and a plurality of planar polygonal segments having shapes and sizes which cover surface segments of the vehicle and connected together along perforated fold lines to permit tearing to expose selected surface segments of the vehicle.

6. A supply of disposable, flexible preforms each adapted to cover and conform generally to the shape of a vehicle over which it is placed and each such preform connected to another such preform along a weakened line and comprising:

an undersurface directly contacting the vehicle, each of said preforms having sufficient flexibility that the entire undersurface directly contacts a planar surface when said preform is disposed on the planar surface; and a plurality of planar polygonal segments having shapes and sizes which cover surface segments of the vehicle and connected together along perforated fold lines to permit tearing to expose selected surface segments of the vehicle.

7. A method of covering a vehicle comprising the steps of:

providing a disposable, flexible, planar preform adapted to cover and conform generally to the shape of a vehicle when assembled and having:

(a) an undersurface directly contacting the vehicle, said preform having sufficient flexibility that the entire undersurface directly contacts a planar surface when said preform is disposed on the planar surface, and (b) a plurality of planar polygonal segments having shapes and sizes which cover surface segments of the vehicle and connected together along perforated fold lines to permit tearint to expose selected surface segments of the vehicle, and placing said disposable, flexible, planar preform over the vehicle to cover the vehicle.

8. A method as claimed in claim 7 further comprisign the step of tearing at least one of said plurality of planar polygonal segments along said perforated fold lines to expose at least one of said selected surface segments of the vehicle.

* * * * *